Sept. 18, 1934.   A. ALSAKER   1,974,092
CONNECTING MEANS
Filed June 9, 1930   3 Sheets-Sheet 2
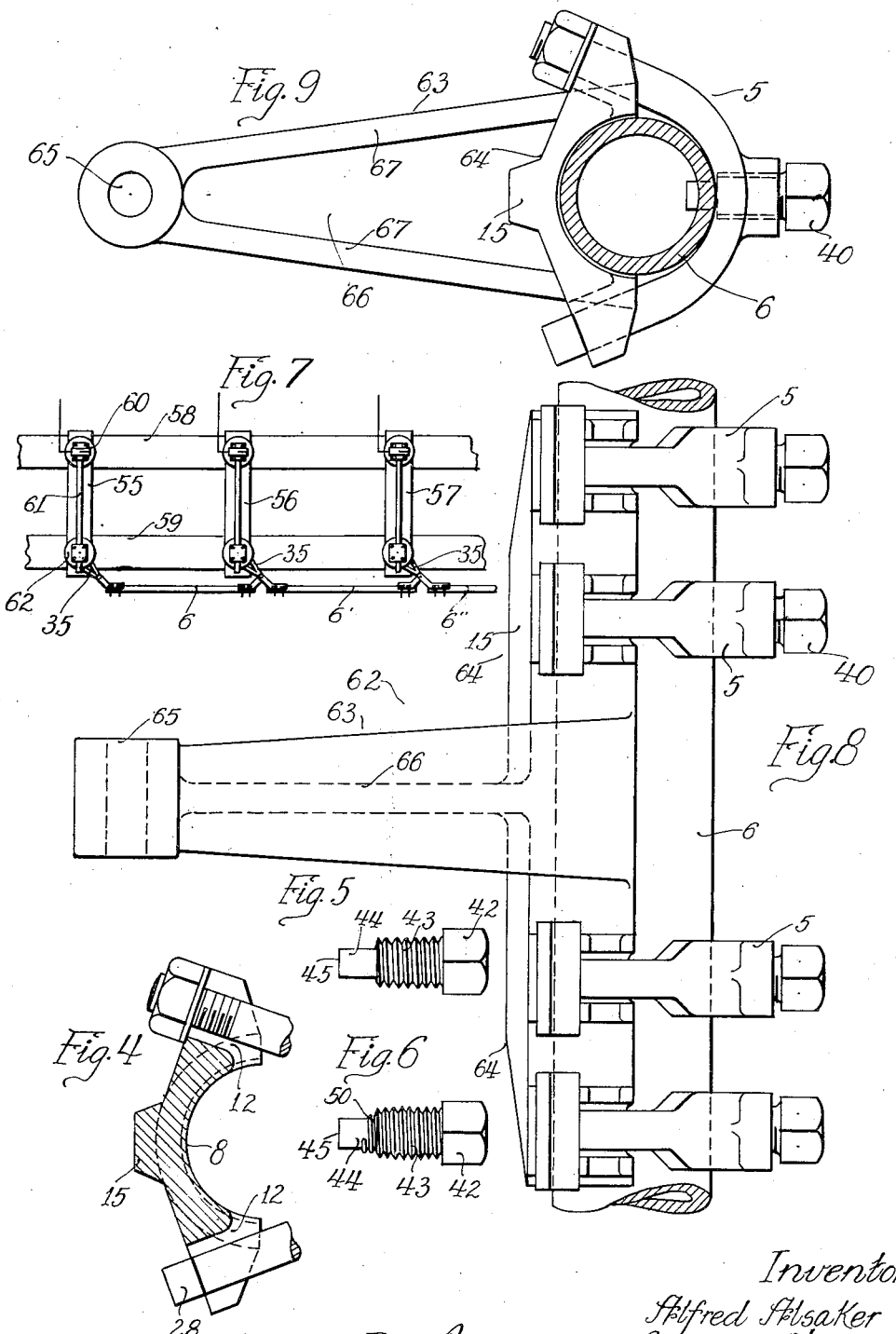

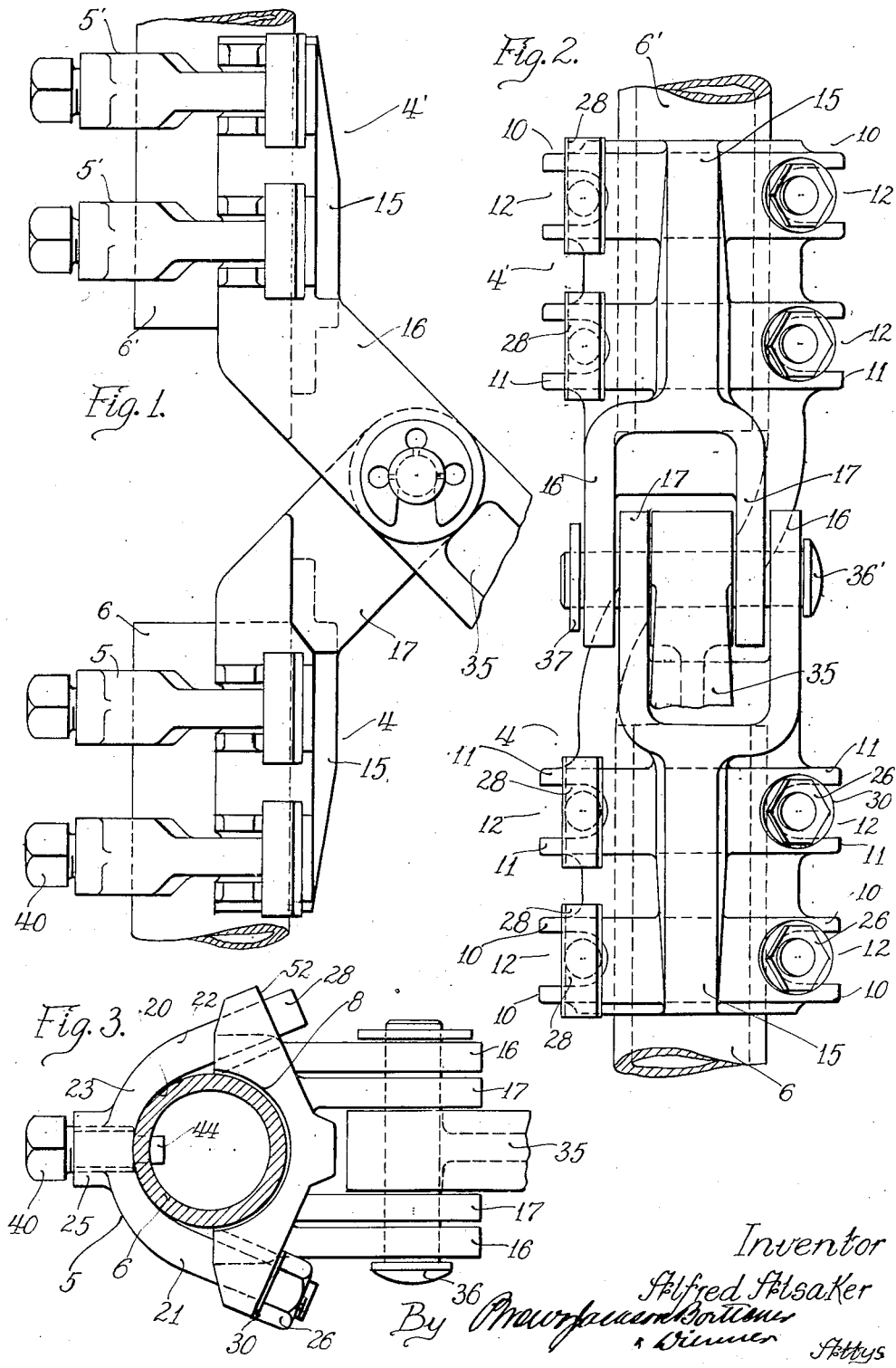

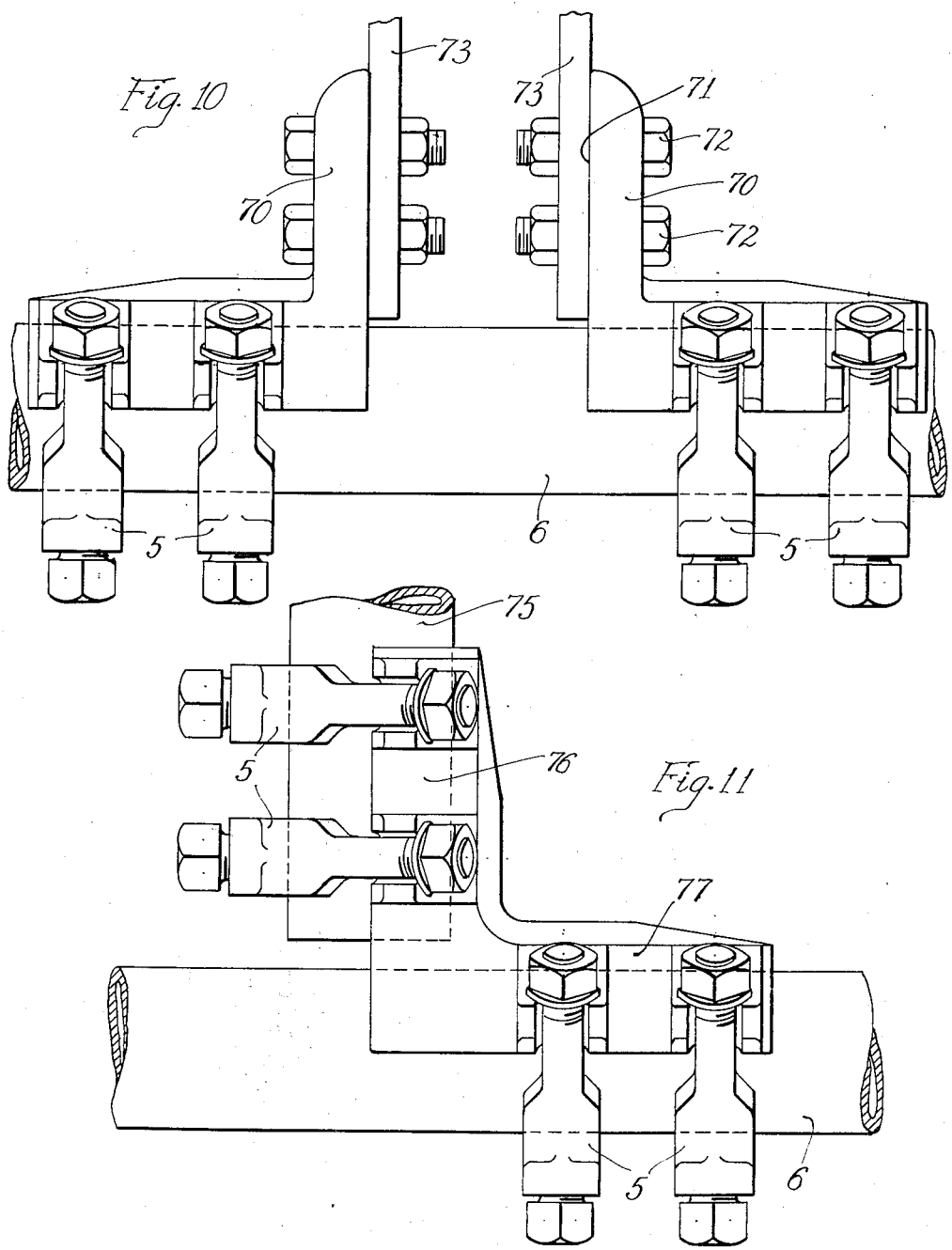

Patented Sept. 18, 1934

1,974,092

UNITED STATES PATENT OFFICE 1,974,092

CONNECTING MEANS

Alfred Alsaker, Chicago, Ill., assignor to The Delta-Star Electric Company, Chicago, Ill., a corporation of Illinois Application June 9, 1930, Serial No. 459,914

12 Claims. (Cl. 287—111)

This application is a continuation in part of my pending applications Serial No. 325,751 filed December 13, 1928 and 426,960 filed February 8, 1930.

This invention relates to connecting means and while it is of general application, it is particularly useful for connecting a member such as a collar, a handle, an operating rod, a joint or the like, to a hollow rod or pipe or to a cylindrical member in general. In each of the above two applications I disclose means for establishing a mechanical connection with a pipe, said means comprising a clevis and yoke construction which are adapted to embrace the pipe and be clamped tightly thereto, the yoke being provided with a set screw which may be threaded into the pipe to punch a hole therein and thus rigidly secure the yoke, and with it the clevis, to the pipe. It is one of the objects of the present invention to provide a yoke construction which may be secured to the clevis by means of a single nut or the like, without necessarily requiring that the pipe be disturbed from its position and without requiring that the yoke be slid along the pipe from one end thereof. In the embodiment of my invention herein illustrated I provide the clevis with two sets of lugs upon the opposite sides thereof, to which the yoke is adapted to be clamped. The yoke is provided with a lug at one end which may be inserted to rest upon the lugs of the clevis, the other leg of the yoke extending between the lugs on the opposite side of the clevis and held in place by a suitable nut or the like. In general this form of yoke is shown in each of my two above referred to applications. The present yoke differs from that shown in my prior application in that it is so constructed that the lug on the yoke may be interlocked with the lugs upon the clevis and then the other leg of the yoke may be swung about the pipe into engagement with the other lugs upon the clevis, all without disturbing the position of the pipe. I am aware that it is old to provide a clevis and a yoke construction for embracing a pipe, wherein the yoke is clamped in place upon the clevis by means of two bolts, said yoke being adapted to be inserted over the pipe without necessarily sliding it along the pipe. However, in dealing with a yoke of the kind having a lug on one leg, and adapted to be locked in place by means of a single bolt, considerable difficulty is encountered if one attempts to insert the yoke over the pipe intermediate the end thereof. In the prior practice it was generally considered necessary to slide the clevis and yoke over one end of the pipe and along the pipe to the desired place. In dealing with long pipes this is impracticable. Also, should it be necessary to replace a yoke in a prior installation one may find that the clevis is so connected at its other end as to necessitate the complete disassembly of the system before the clevis can be slid down along the pipe. It is one of the objects of the present invention to provide a yoke and clevis which may be secured together by a single screw and wherein the clevis and yoke may be placed around a pipe at any point intermediate its end without requiring the displacement of the pipe nor the sliding of the clevis or yoke along the pipe. I attain this end by making the legs of the yoke sufficiently divergent to permit a swinging of the yoke about the clevis upon the loosening of the nut that holds the yoke in place.

It is a further object of the present invention to provide a clevis so constructed as to permit the use of two such clevises to join two pipes that are in longitudinal alignment with one another. This is accomplished by providing a pair of arms upon the clevis, said arms being spaced at unequal distances from the center of the clevis. Or, stated in other words, one of the arms is offset. Two such clevises may be joined together with their centers in alignment. While this is of general application, it is particularly applicable to gang operated switches. In poly-phase systems the switches of the respective phases are preferably operated in unison. This is accomplished by mounting the switches side by side in spaced relationship and extending a single operating pipe between the switches. The pipe may be rotatable or longitudinally movable to actuate the switches, and a crank or other suitable means is provided for transmitting the motion of the pipe to each of the switches. In the past, it has been the general practice to provide a single continuous pipe between the switches. With increasing voltages which have come into use in recent years the spacing between the switches of the respective phases has become considerable and therefore the connecting pipe is of great length. In order to obtain certain advantages in the construction, assembly and operation of such operating pipes it has been suggested to split the pipes into a number of sections connected together. The sections are connected by suitable clevises. Heretofore adjacent pipe sections were necessarily offset with respect to one another. By providing the clevises, that join the pipes, with offset arms, the pipes may be mounted in alignment with one another and two identical clevises may be used for joining them. This appreciably simplifies the construction and assembly operation since the bearings and the like for supporting the pipe sections at the various points may be in alignment and the parts of the various switch pole units may be of identical construction. This is but one of the general uses to which my improved clevis with its offset arms may be put.

My improved connecting means is applicable to structural elements as well as to operating elements and may be embodied in the form of angle connecting members for connecting a pipe with another pipe or other member disposed angularly thereto, or may be embodied in a form adapted to connect two aligned structural pipe members together, or to connect two pipes of an operating mechanism together.

Now, in order to acquaint those skilled in the art with the manner of practicing my invention, I shall describe in connection with the accompanying drawings, a few preferred embodiments of the same, from which the attainment of the above and further objects of the present invention will be apparent.

In the drawings:

Figure 1 is a side view of two sections of an operating pipe connected together and to a control rod or crank by means of two of my improved clamping devices;

Figure 2 is a front view of the mechanism shown in Figure 1;

Figure 3 is a bottom view of the mechanism shown in Figures 1 and 2;

Figure 4 is a fragmentary sectional view showing the manner of connecting the yoke to the clevis;

Figure 5 is a view of the self-piercing set screw used;

Figure 6 is a view of a modified form of set screw;

Figure 7 is a plan view of a gang operated switch where the operating rods extending between the poles are connected together and to the operating cranks that rotate the insulators, by means of my improved connecting means;

Figure 8 is a side view of a modified form of clamping device to which my invention has been applied;

Figure 9 is a top plan view thereof;

Figure 10 is a view of a modified form of my invention, said form being particularly adapted for fastening barriers, switch truss blades and the like to a pipe; and Figure 11 is a side view of still another form of clamping device which is particularly applicable for splicing pipes that are disposed at an angle to one another in a structure.

Referring now more particularly to the drawings, the connecting means comprises essentially two main parts, a clevis 4 and a yoke 5. The clevis 4 shown in the drawings is adapted to be connected to a pipe 6 by means of two yokes 5 although it is to be understood that a single yoke may be used if desired. The clevis 4 is provided with a cylindrical surface 8 which is adapted to seat upon the outside of the pipe 6, said cylindrical surface extending slightly less than half way round the circumference of the pipe. The clevis is provided with two sets of ears indicated at 10—10 and 11—11 which extend outwardly therefrom and are provided with a generally U-shaped slot indicated at 12—12 for receiving the ends of the yoke. The clevis is provided with a reinforcing ridge 15 and is provided with two spaced arms 16 and 17 for receiving a connecting crank or the like between them. It is to be noted that the arms 16 and 17 are not equally spaced from the center line of the clevis. The arms are of equal thickness and the distance between the arm 16 and the center line of the pipe exceeds the distance between the arm 17 and the center line of the pipe by an amount slightly in excess of the thickness of the arm 17. The yoke 5 has a cylindrical portion 20 which is adapted to seat on the pipe 6. A pair of arms 21 and 22 extend from the curved portion 23 of the yoke, said arms being tangent to the curve 20 of the yoke and being substantially 45° to one another. A reinforcing projection 25 is formed on the curved portion 23 of the yoke, said reinforcing portion being tapered and threaded to receive a set screw indicated in general at 40. The end of the arm 21 is screw threaded to receive a nut 26 and the end of the arm 22 has a lug 28 formed thereon and extending at right angles thereto. The lug 28 extends to both sides of the arm 22 as may be seen in Figures 1 and 2.

To mount the clevis and yoke upon the pipe 6 the clevis is placed with its circular part 8 around the pipe and the arm 22 of the yoke is inserted into the U-shaped slot 12 of the clevis. At this time the arm 21 is not in embracing relationship to the pipe 6. When the arm 22 has been inserted into the slot 12 with the lug 28 resting upon the ears 10—10 or 11—11 the yoke 5 is turned so as to bring the arm 21 into the corresponding slot 12 on the opposite side of the clevis. A nut 26 is then placed upon the end 21 of the yoke and is turned until it engages the projections on the clevis. It is of course to be understood that if desired a washer, indicated at 30, may be interposed between the nut 26 and the clevis. This washer may of course be omitted if desired. If the clevis and the yoke are not already in the desired position lengthwise of the pipe they may then be shifted along the pipe until they are brought into the desired position.

In Figures 1 and 2 I have shown my improved clevis and yoke construction as applied to a switch operating mechanism, said clevis and yoke construction being used to connect two operating pipes together and to an operating crank. The pipes to be connected together are disposed in longitudinal alignment, being co-axial with respect to one another, said pipes being indicated at 6 and 6' respectively. In order to secure the two pipes together a clevis 4' and a pair of yokes 5' are secured to the pipe 6', said clevis and yokes being of a construction identical to the clevis and yoke 4 and 5 respectively, which have been previously described. The clevis 4' and the yokes 5' are secured to the pipe 6' in the same manner as were the clevis and yokes previously described. The reason for the offset in the arm 16 of the clevises will now be apparent. As previously pointed out, the arm 16 is spaced from the center line of the clevis a distance greater than is the arm 17, the difference in spacing being slightly more than the thickness of the arm 17. The arms 16 and 17 of the two clevises are now brought into a position such as is shown in Figure 2, that is into a position with the arms 16 on the outer sides and the arms 17 of each clevis extending into the space between the arms of the opposite clevis. A crank 35 is inserted in the space between the arms 17 of the two clevises and a pin 36' is extended through aligned holes in the arms 16 and 17 of the two clevises and through a corresponding hole in the crank 35, said pin maintaining the arms of the clevises and the crank together. A washer 37 is slipped over the end of the pin 36', said washer extending over a peripheral groove in the end of the pin and being then tightened into the groove to prevent inadvertent displacement of the pin 36'. The crank 35 may be of any approved construction, one such crank suitable for use in this connection being shown in the pending application of myself and Elias G. Corneliussen, Serial No. 378,337 filed July 15, 1929. Likewise the washer 37 may be of any approved construction although I prefer to use a locking washer of the type shown in my pending application Serial No. 325,752 filed December 13, 1928. When the parts have been assembled, the nuts 26 are tightened to rigidly clamp the respective yoke and clevis portions to the pipes. Set screws 40, which may be of a construction such as is shown in Figures 5 or 6 may then be mounted in place in order to rigidly secure the clevis and yoke against sliding or turning movement along the pipes.

The set screw shown in Figure 5 has a head 42, which may be square or hexagonal or of any other polygonal shape in order to facilitate the turning thereof by means of a wrench or the like, a threaded shank 43, and a smooth cylindrical projection 44 of considerably less diameter than the threaded shank 43. The end of the projection 44 is substantially flat and at right angles to the cylindrical surface of the projection 44, forming a sharp cutting edge at 45. The set screw, after being completely machined is chromium plated to give it a hard wearing surface and to increase its resistance against corrosion. The chromium plating gives the set screw a better cutting surface in that the end of the projection 44 will stand up throughout its entire travel through the pipe. As a result, a neater hole is obtained, and the projection 44 is held therein rigidly by the frictional resistance between the projection 44 and the sides of the hole formed thereby, so as to prevent inadvertent loosening of the set screw.

The set screw is turned in the threaded hole in the yoke 5 until the sharp cutting edge 45 abuts against the pipe 6. The screw is then further turned so that the projection 44 is forced into the pipe. This is accomplished primarily by a punching operation with the sharp cutting edge at the juncture of the cylindrical surface of the projection and the end 45 thereof forcing the metal of the pipe 6 to give. Because the area of the end of the set screw is relatively small, an extremely high unit pressure is obtained without applying more than a moderate turning effort. By providing a shoulder between the threaded shank and the perforating portion of the set screw, and screwing the set screw down until this shoulder bears heavily on the surface of the pipe around the hole I find that the set screw tends to be held in place against loosening from the pipe. The heavy pressure around the surface of the pipe immediately around the hole causes the side walls of the hole to be drawn tightly against the side of the perforating portions of the set screw and the greater the pressure on the surface of the pipe the tighter will the set screw be gripped in the hole. This gripping action greatly increases the frictional resistance offered by the walls of the hole against any tendency of the screw to become loose.

In Figure 6 I have shown a modified form of my set screw. This set screw is similar to the one shown in Figure 5 differing therefrom only in that a few threads, indicated at 50, are provided at the upper end of the projecting portion 44. These threads enter the hole in the wall of the pipe just before the set screw is driven completely home and form corresponding threads in the pipe with the result that a better and firmer union is obtained. This action of the threads 50 does not take place until substantially the entire hole is formed in the pipe so that the necessity of cutting the thread does not add appreciably to the effort required to force the set screw home. I find that a better joint is secured by providing a square thread at 50 rather than a V-shaped thread as is provided on the shank of the screw. Obviously the pitch of the thread on the projecting portion of the set screw should be the same as the pitch of the thread on the shank of the set screw.

To remove the yoke from the pipe it is merely necessary to first unscrew the set screw until the cylindrical projection 44 leaves the pipe 6 and to remove the nut 26. The arm 22 may then be moved in the slot 12 by turning the yoke 5 about the pipe 6 in a generally clockwise direction as seen in Figure 3. During this turning the arm 21 is withdrawn from the slot 12 wherein it extended. After a small amount of turning of this kind the yoke may be slid along the surface 52 of the ears 11 so as to remove the yoke from the clevis. It is to be noted that the surface 52 makes an angle of approximately 90° with the arm 22 when the yoke is locked to the clevis. Since the arm 21 makes an angle of approximately 45° with the arm 22 then it is apparent that the amount of turning of the arm 22 in order to permit sliding of the projection 28 along the surface 52 is somewhat less than 45°.

While I have herein illustrated a form of my invention wherein the set screws extend through the yokes, this is not indispensable. In so far as the broad aspects of my invention are concerned, the set screws may be entirely omitted if desired, or they may be extended through the ridge 15 in the clevis, instead of through the yoke. When this is done then the ridge 16 is suitably tapped and screw threaded in the same manner as is the portion 25 in the embodiment herein illustrated. In most constructions a single set screw extending through the clevis and into the pipe will be sufficient, although two or more of such set screws may be used if deemed necessary or desirable.

Reference may now be had more particularly to Figure 7 which illustrates one of the applications of my new connecting means. In this figure I show a switch comprising three similar units 55, 56, and 57 which may be of any approved construction, said switches being high voltage outdoor disconnect switches. The switches are mounted upon members 58 and 59 in a manner well known in the art and each comprises an insulator 60 which supports a contact that is adapted to be engaged by a blade 61 mounted upon a rotatable insulator 62. Upon rotation of the insulator 62 the blade 61 is swung into and out of engagement with the contact mounted on top of the insulator 60. A crank 35, which may be the crank of Figures 1 and 2, is connected to rotate the insulator 62. The three switches here shown are adapted to be used on a three phase system and are connected together to be gang operated. For this purpose the pipes 6 and 6' extend between the three switches, these pipes being connected together in a manner such as is shown in Figures 1 and 2. The pipe portion 6' is connected to another pipe portion 6" which is adapted to be reciprocated and thereby reciprocate the pipes 6 and 6', all in a manner well known in the art. The connection between the pipe 6' and the pipe 6" is substantially the same as shown in Figures 1 and 2. It is apparent from the description given above in connection with Figures 1 and 2 that the pipes 6 and 6' are in longitudinal axial alignment. It is believed to be broadly new to arrange a gang operated switch so that the operating rod between the pole units is discontinuous and the parts being in alignment. In the past the sections of the operating rod for such switches were offset with respect to one another.

It is sometimes necessary to connect a pipe such as the pipe 6' with a crank such as the crank 35, there being only one such pipe. While I have shown, in Figures 1 and 2, my improved clevis and yoke construction used for connecting such a crank to two pipes in alignment the same may be used for establishing a connection to a single pipe. Such occasion may arise in connection with a switch such as the switch 55 of Figure 7, said switch being the last one of the gang switches. In such an arrangement the clevis such as the clevis 4 and yokes such as the yokes 5 are secured to the end of the pipe 6' in the same manner as was previously described. Now, it is to be noted that the arms 16 and 17 of the clevis are spaced unequally from the center of the pipe shaft. This is not necessary when only a single pipe is joined to a crank and therefore a washer of a thickness equal to the thickness of one of the arms 17 of the clevis is inserted adjacent the crank 35 and between the two arms 16 and 17 of the clevis, the pin 36' extending through the arm of the clevis, the crank 35, and the washer. The pin 36' may be made slightly shorter in such a case since it need only extend a distance slightly in excess of the distance between the outer surfaces of the arms 16 and 17.

Reference may now be had to Figures 8 and 9 showing a somewhat modified form of clevis embodying the principles of my invention. The clevis is indicated by the reference numeral 62 and comprises a crank arm 63 which extends outwardly from two arm portions 64—64, the crank 63 and the arm portions 64 constituting an integral unit. The arm portions 64 are provided with semi-cylindrical surfaces which may seat upon a pipe such as the pipe 6, each of said arm portions being of a construction substantially identical to the portion of the clevis 4 that rests against the pipe, as previously described. Each of these extended arm portions is provided with two sets of ears upon the opposite sides thereof for receiving yokes 5 of a construction such as has been previously described. It is believed that the manner of attaching this connecting clevis to the pipe 6 will be apparent from the preceding description.

The crank arm 63 may be provided with a central hole formed at the end thereof and indicated at 65 whereby a desired connection may be established thereto. The body portion of the crank arm consists of two reenforcing members 67—67 joined by a substantially triangular web 66 as illustrated.

In Figure 10 I show another form of my improved clevis. This clevis is substantially the same as is clevis 4 of Figure 1, differing therefrom in that the arms 16 and 17 of that clevis have been omitted and in place thereof there is provided an upstanding portion 70 at right angles to the body portion of the clevis and provided, preferably, with a flat surface 71 and a number of bolt holes for receiving bolts 72 for clamping an object such as 73 thereto. The object 73 may comprise a barrier, switch truss blades, or the like. When used to connect the arms of a truss blade to a pipe such as pipe 6 two such clevises are used, the two legs of the truss being secured one to each of the clevises.

In Figure 11 I show still another form of my improved clevis. This form is similar to that shown in Figure 10, differing therefrom in that the portion 70 thereof is arranged to receive a pipe 75 in the same manner as is the other portion adapted to receive a pipe 6. This constitutes a double clevis, the two clamping portions of which are indicated at 76 and 77 respectively each being substantially similar to the clamping portion of the clevis 4 of Figure 1. This clevis is adapted to be connected to the respective pipes by means of yokes 5 of a construction such as has been previously described. While I have herein shown the portions 76 and 77 as being at right angles to one another I do not intend to be limited to this arrangement since they may be disposed at any other desired angle to one another. This clevis may be used as a means for connecting two pipes in a structure of any kind whatsoever, whether the pipes be stationary or whether one of the pipes transmits motion to the other. For instance, it is common practice at the present time to use tubular switch blades. One of the pipes 75 or 6 of Figure 11 may constitute a switch blade which is supported by the other pipe by means of my improved clevis and yoke construction.

While I have herein shown and described a few preferred embodiments of my invention it is to be understood that the invention is not limited to the precise forms herein shown, the same being merely illustrative. What I consider new and desire to secure by Letters Patent is:

1. In a pipe clamp, a frame member having slotted lugs on opposite sides, and a yoke having a lug at the end of one leg adapted to interlock with the lug on one side of the frame member and having threads on the end of the other leg adapted to engage the slot of the lug on the other side of the frame member and receive a clamping nut, said legs being disposed with reference to the pipe to permit swinging of the last mentioned leg into and out of its lug on the frame when the clamping nut is removed and the lug on the other leg of the yoke is interlocked with the corresponding lug on the frame member, a set screw in the yoke, and a pair of parallel outwardly extending arms integral with the frame by which a connecting rod may be connected to the clamp, said arms being non-symmetrically spaced from the longitudinal central plane of the frame, with the distance between the longitudinal central plane and the closest arm equal to at least half of the thickness of the connecting rod to be received.

2. In a pipe clamp, a semi-cylindrically shaped frame for receiving a pipe, a yoke adapted to cooperate with the frame to clamp the pipe to the frame, and a pair of parallel outwardly extending arms integral with the frame by which a connecting rod may be connected to the clamp, said arms being spaced apart by an amount at least equal to the thickness of an arm plus the thickness of a connecting rod, said arms being at unequal distances from a central plane extending through the axis of said frame.

3. In a pipe clamp, a semi-cylindrically shaped frame for receiving a pipe, a yoke adapted to cooperate with the frame to clamp the pipe to the frame, and a pair of parallel outwardly extending arms integral with the frame by which a connecting rod may be connected to the clamp, said arms being spaced apart an amount at least equal to the thickness of an arm plus the thickness of a connecting rod, the distance from one of said arms to a plane extending through the central axis of said frame being substantially equal to the distance from the other arm to the plane plus the thickness of one arm.

4. A pipe splicing device comprising two identical pipe clamping mechanisms, each clamping mechanism comprising a semi-cylindrically shaped frame for receiving a pipe and a yoke adapted to cooperate with the frame to clamp the pipe to the frame, the frame having a pair of parallel outwardly extending arms both spaced from the longitudinal central plane of the frame and by unequal amounts, the two mechanisms being clamped to the two pipes to be spliced, respectively, and the arms of the two mechanisms being nestled together, spacing means located centrally between them, and a splicing connection between the two sets of arms and the spacing means.

5. As an article of manufacture, a clamp member having a body portion with a concave face for engaging and gripping a cylindrical rod, said member having a pair of arms at one end of the body portion, means independent of the arms for clamping said member to a rod, said concave face having an axis adapted to coincide substantially with the longitudinal axis of the rod to be clamped, said arms lying in planes substantially parallel to the axis of the concave face and both spaced therefrom by different amounts with the total distance between the arms substantially greater than the thickness of one of said arms.

6. In combination, a pair of substantially similar clamping members for clamping a pair of rods in axial alignment, each of said members comprising a portion adapted to embrace a portion of a pipe and be clamped thereto, and a pair of clamping arms spaced at unequal distances from the axis of the clamping portion, and a distance apart substantially in excess of the thickness of one of the arms, with the arm closest to the axis spaced therefrom by substantially half of said excess distance.

7. A clamp comprising a concave face adapted to engage a curved member, and a pair of side by side arms spaced at unequal distances from the longitudinal center plane of the clamp, the difference in the distance to the longitudinal center plane being at least equal to the thickness of one of the arms and the distance from the longitudinal center plane to the closest arm being at least equal to a substantial fractional part of the thickness of one of the arms.

8. Means for making a mechanical connection to a pipe, comprising a frame member having a semi-cylindrical portion adapted to fit over a pipe and having on opposite sides thereof a pair of slotted lugs extending outwardly therefrom, a U-shaped yoke member the ends of which are adapted to extend into the slots whereby the two members embrace the pipe, means on the end of the yoke member and bearing against the face of the lugs for drawing the two members together to firmly grip a pipe, an internally threaded reinforcing ridge on the outside of one of the members, and a self-piercing screw threaded through the reinforcing ridge and including a punch portion of lesser diameter than the threaded portion and adapted to be forced into and pierce the pipe.

9. Means for making a mechanical connection to a pipe, comprising a frame member having a semi-cylindrical portion adapted to fit over a pipe and having on opposite sides thereof a pair of slotted lugs extending outwardly therefrom, a U-shaped yoke member the ends of which are adapted to extend into the slots whereby the two members embrace the pipe, means on the end of the yoke member and bearing against the face of the lugs for drawing the two members together to firmly grip a pipe, said means comprising a lug integral with one of the arms and a nut threaded on the other arm, an internally threaded reinforcing ridge on the outside of one of the members, and a self-piercing screw threaded through the reinforcing ridge and including a punch portion of lesser diameter than the threaded portion and adapted to be forced into and pierce the pipe.

10. Means for making a mechanical connection to a pipe, comprising a frame member having a semi-cylindrical portion adapted to fit over a pipe and having on opposite sides thereof a pair of slotted lugs extending outwardly therefrom, a U-shaped yoke member the ends of which are adapted to extend into the slots whereby the two members embrace the pipe, means on the end of the yoke member and bearing against the face of the lugs for drawing the two members together to firmly grip a pipe, an internally threaded reinforcing ridge on the outside of one of the members, and a self-piercing screw threaded through the reinforcing ridge and including a punch portion of lesser diameter than the threaded portion and adapted to be forced into and pierce the pipe, one of said members including a pair of parallel extending arms formed integrally therewith for establishing a mechanical connection thereto, the distance from one of said arms to a plane extending through the central axis of said frame being substantially equal to the distance from the other arm to the plane plus the thickness of one arm.

11. Means for making a mechanical connection to a pipe, comprising a frame member having a semi-cylindrical portion adapted to fit over a pipe and having on opposite sides thereof a pair of slotted lugs extending outwardly therefrom, a U-shaped yoke member at least one end of which is threaded and the ends of which are adapted to extend into the slots whereby the two members embrace the pipe, means including a nut on the end of the yoke member and bearing against the face of the lugs for drawing the two members together to firmly grip a pipe, an internally threaded reinforcing ridge on the outside of one of the members, and a self-piercing screw threaded through the reinforcing ridge and including a smooth cylindrical punch portion of lesser diameter than the threaded portion and adapted to be forced into and pierce the pipe.

12. Means for making a mechanical connection to a pipe, comprising a frame member having a semi-cylindrical portion adapted to fit over a pipe and having on opposite sides thereof a pair of slotted lugs extending outwardly therefrom, a U-shaped yoke member at least one end of which is threaded, and the ends of which are adapted to extend into the slots whereby the two members embrace a pipe, means including a nut threaded on the ends of the yoke member and bearing against the face of the lug for drawing the two members together to firmly grip a pipe, one of the members having a tapped hole extending therethrough, and a self-piercing screw threaded through the hole and including a smooth cylindrical punch portion of lesser diameter than the threaded portion and adapted to be forced into and pierce the pipe and being threaded at its inner end to cut threads in and thread into the pierced portion of the pipe.

ALFRED ALSAKER.